Figure 1:
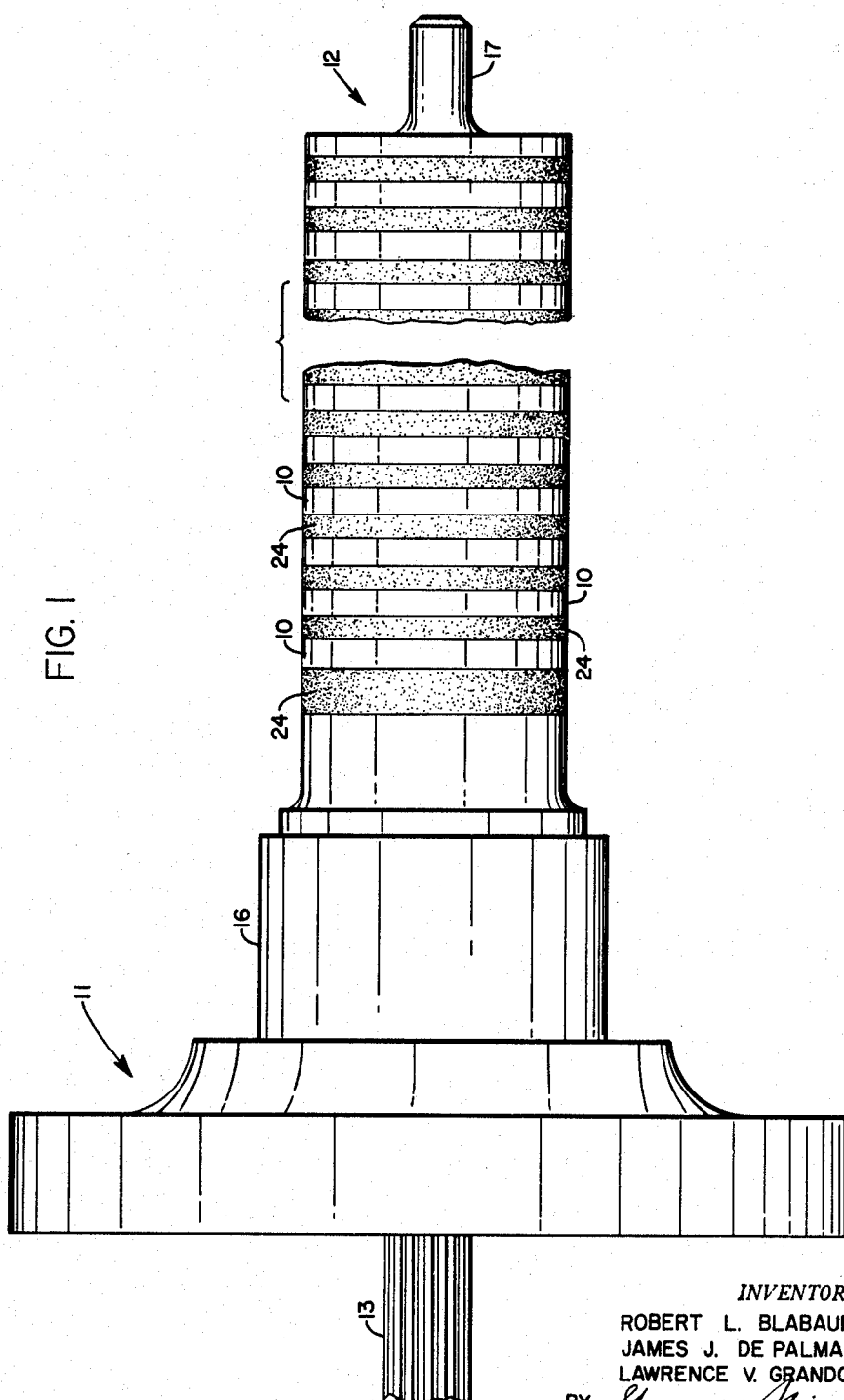

Oct. 6, 1964    R. L. BLABAUM ETAL    3,151,384
METHOD OF MAKING ELECTRICAL COLLECTOR MEANS
Filed Dec. 19, 1960    2 Sheets-Sheet 1

INVENTORS.
ROBERT L. BLABAUM
JAMES J. DE PALMA
LAWRENCE V. GRANDCHAMP
BY
ATTORNEY

Oct. 6, 1964   R. L. BLABAUM ETAL   3,151,384
METHOD OF MAKING ELECTRICAL COLLECTOR MEANS
Filed Dec. 19, 1960                     2 Sheets-Sheet 2

INVENTORS.
ROBERT L. BLABAUM
JAMES J. DE PALMA
LAWRENCE V. GRANDCHAMP
BY
ATTORNEY

3,151,384
METHOD OF MAKING ELECTRICAL COLLECTOR MEANS
Robert L. Blabaum and James J. De Palma, Largo, and Lawrence V. Grandchamp, Clearwater, Fla., assignors to Minneapolis-Honeywell Regulator Company, Minneapolis, Minn., a corporation of Delaware
Filed Dec. 19, 1960, Ser. No. 76,588
1 Claim. (Cl. 29—155.5)

This invention relates to the field of electrical apparatus and more particularly to collector means for conducting electricity between two relatively movable members, and to a method of making such collector means.

The developement of inertial platforms has led to the need for means to maintain electrical continuity in circuits extending through the gimbals of the platforms. In such applications compactness and lightness are preeminent requirements, while ordinarily the amount of current carried is trifling as there are relatively few power circuits involved: the sophistication of the circuitry involved, however, generally calls for a large plurality of independent conducting paths and hence for a large number of slip rings at each pivot point.

Slip ring assemblies heretofore known have generally been either of the built-up type, involving accurate assembly of a large number of individual cards, or of the electrodeposited type, in which a groove form of insulated material has the bottoms of its grooves plated with a suitable metal, wires in the form terminating at the bottoms of the respective grooves so that the metal may also be electrodeposited on them to provide connections to the several rings. The former type suffers from the disadvantage of relatively large size, while the latter has been proven rather unreliable in that the connections between electric deposited metal and the wires frequently become interrupted.

The present invention has for its object to provide improved slip ring assemblies in which the two disadvantages mentioned are avoided, and resides both in the slip ring structure and in the method of constructing it. It will be appreciated that the invention is not limited to apparatus for use for the relatively rotatable members, or in inertial platforms, but may also be adapted for use with relatively translatable members, and in other electrical environments.

Various other objects, advantages, and features of novelty not individually enumerated above which characterize our invention are pointed out with particularity in the claim annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described a preferred embodiment of our invention.

Figure 2:
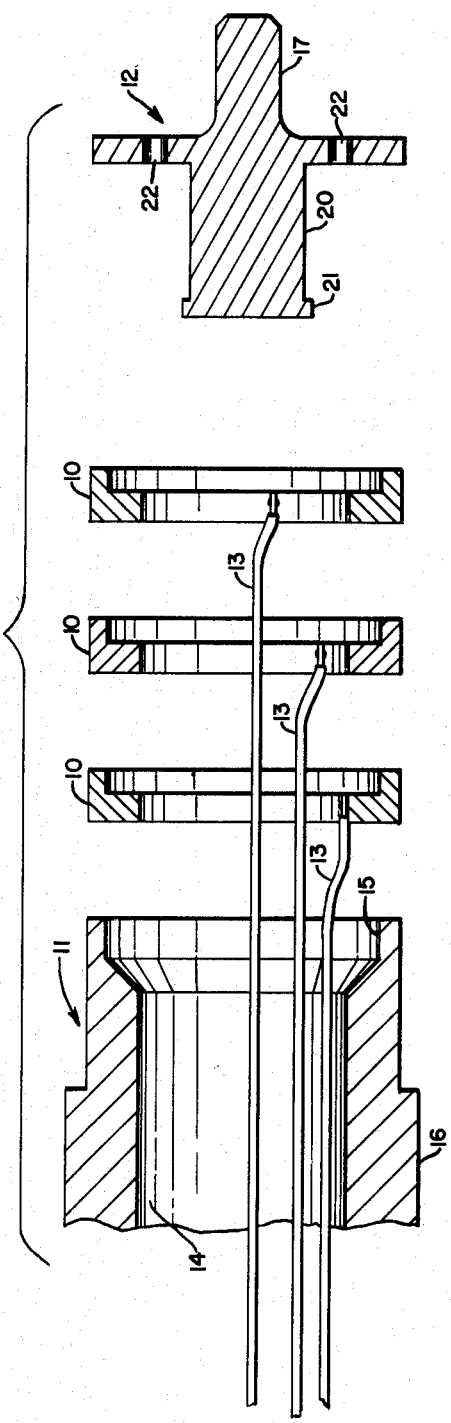
Figure 3:
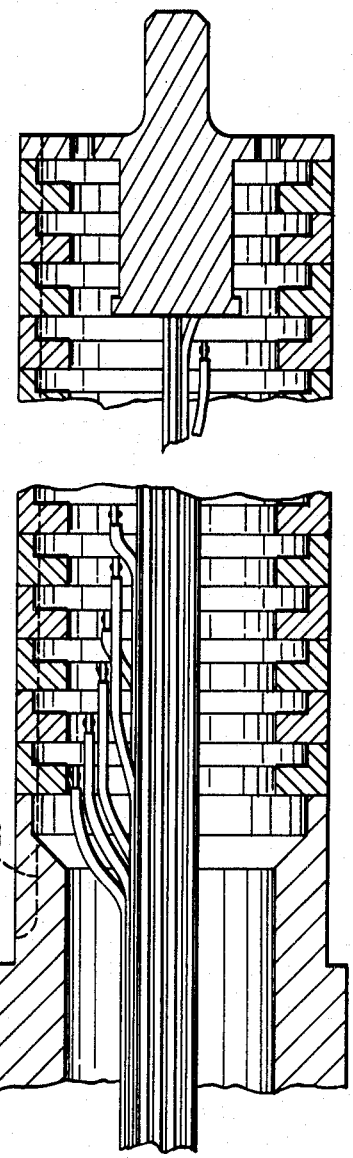

In the drawing FIGURE 1 is a view in elevation showing a completed slip ring assembly according to the invention, and FIGURES 2 and 3 are sectional views showing stages in the manufacture thereof.

As shown in FIGURE 2, an illustrative slip ring assembly is made up of a plurality of shouldered metallic discs 10 and a pair of end caps 11 and 12. For simplicity of illustration only three discs 10 are illustrated in FIGURE 2, but it will be understood that the number of discs used is determined by the number of slip rings desired. The axial length of the shoulders is similarly determined by the desired spacing between the adjacent slip rings, and the thickness of the discs by the desired width of the slip rings. The discs are centrally apertured, and to each disc is spot-welded an electrical conductor 13 for making connection with the disc. Except at their points of attachment to the several discs the conductors are insulated, and they pass in one direction through the successive discs and through end cap 11. It will be apparent that the minimum size of the apparatus is determined by the number of conductors which must pass through and hence by the number of rings to be assembled together: the inside diameter of the shoulders must be suitably greater, and the outside diameter still greater. In one embodiment of the invention these three diameters were .110 inch, .144 inch, and .164 inch, respectively.

End cap 11 is bored at 14 to pass conductors 13, and is counter-bored at 15 to give a lip having the same thickness as and slightly greater length than the shoulders on discs 10. It is also provided with a cylindrical bearing portion 16 adapted to receive the inner race of a suitable antifriction bearing as a pressfit thereon.

End cap 12 is of the same external diameter as discs 10, and has an outwardly directed bearing element 17 and an inwardly directed stud 20 having a ridge 21 which is considerably smaller than the inner diameter of discs 10. Cap 12 is further provided with apertures 22 for a purpose presently to be disclosed.

In constructing a slip ring assembly according to the invention, a number of discs 10, with conductors 13, equal to the desired number of rings in the finished assembly is arranged in axial alignment. The conductors are fed through end cap 11, end cap 12 is applied, and the whole cylindrical stack is clamped in a suitable mold, in the relationship shown in FIGURE 3. A suitable plastic not shown in FIGURE 3 is next injected through the opening in end cap 11: it embeds conductors 13, fills the spaces between the discs not occupied by the shoulders, as well as the space between the discs and end cap 12, and any excess passes out through apertures 22. The assembly remains in the mold until the plastic is hardened, after which it can be removed as a unitary mass. It is next mounted for rotation about the axis of bearing means 16 and 17 and reduced in diameter by turning or grinding as indicated by the broken line 23 in FIGURE 3. By this procedure the electrical connections between the discs formerly supplied by the contacting shoulders are removed, and the discs remain spaced, aligned, supported, and insulated by the plastic. This is best shown in FIGURE 1, where the plastic 24 is shown by the solid black portion between the several discs, and between the end discs and the end caps. Any excess plastic protruding through openings 22 is of course trimmed off.

It will be apparent that shallow grooves can be turned in the edges of elements 10 if desired, to inhibit axial movement of the cooperating brushes. It will also be appreciated that the presence of conductors 13 in the plastic give it additional strength in the same way and reinforcing bars strengthen concrete columns: the plastic element may indeed be quite meaningfully referred to as "monolithic" since the central stem and the radial insulating laminae are all formed at once of a single mass of material.

Numerous objects and advantages of our invention have been set forth in the foregoing description, together with details of the structure and function of the invention, and the novel features thereof are pointed out in the appended claim. The disclosure, however, is illustrative only, and we may take changes in detail, especially in matters of shape, size, and arrangement of parts, within the principle of the invention, to the full extent indicated by the broad general meaning of the terms in which the appended claim are expressed.

We claim as our invention:
The method of making a collector assembly for conducting electricity between two relatively movable struc- tures which comprises steps of fastening conductors to the inner surface of a plurality of centrally apertured conductive discs, each of which has a single peripheral shoulder of substantial axial thickness located at the outer edge of said disc; stacking said discs in axial alignment so they are spaced by the shoulders thereon, and thereby form a sealed cavity within which said conductors are contained; applying end caps to the stack, one of said end caps being apertured to pass said conductors; injecting an adhesive insulating plastic into said cavity to fill said cavity including the space between said discs not occupied by the shoulders thereon; and removing said shoulders after said plastic is hardened so that said discs and said end caps are mutually insulated and solely supported by said plastic and so that the exposed edges of said discs and said end caps comprise the slip surfaces of the collector assembly.

References Cited in the file of this patent

UNITED STATES PATENTS

| | | |
|---|---|---|
| 1,486,893 | Himes | Mar. 18, 1924 |
| 2,455,864 | Hanna | Dec. 7, 1948 |
| 2,471,808 | Baker | May 31, 1949 |
| 2,473,526 | Hood et al. | June 21, 1949 |
| 2,554,008 | Burger | May 22, 1951 |
| 2,651,834 | Klym | Sept. 15, 1953 |
| 2,696,658 | Polard | Dec. 14, 1954 |
| 2,786,985 | Merety | Mar. 26, 1957 |
| 2,934,815 | Stumbock | May 3, 1960 |
| 2,961,385 | McGall | Nov. 22, 1960 |
| 3,042,998 | Sweett et al. | July 10, 1962 |